United States Patent
Caruba et al.

(10) Patent No.: US 10,353,081 B2
(45) Date of Patent: Jul. 16, 2019

(54) GAMMA SYSTEM COUNT LOSS CORRECTION WITH VIRTUAL PULSE INJECTION

(71) Applicant: Siemens Medical Solutions USA, Inc., Malvern, PA (US)

(72) Inventors: James Frank Caruba, Bartlett, IL (US); Ronald E. Malmin, Chicago, IL (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 0 days.

(21) Appl. No.: 15/567,469

(22) PCT Filed: Apr. 20, 2016

(86) PCT No.: PCT/IB2016/052228
§ 371 (c)(1),
(2) Date: Oct. 18, 2017

(87) PCT Pub. No.: WO2016/170478
PCT Pub. Date: Oct. 27, 2016

(65) Prior Publication Data
US 2018/0113222 A1    Apr. 26, 2018

Related U.S. Application Data
(60) Provisional application No. 62/151,557, filed on Apr. 23, 2015.

(51) Int. Cl.
*G01T 1/17* (2006.01)
*G01T 1/20* (2006.01)
*G01T 1/208* (2006.01)
*G06T 11/00* (2006.01)

(52) U.S. Cl.
CPC .............. *G01T 1/171* (2013.01); *G01T 1/20* (2013.01); *G01T 1/2006* (2013.01); *G06T 11/008* (2013.01)

(58) Field of Classification Search
None
See application file for complete search history.

(56) References Cited

U.S. PATENT DOCUMENTS

| | | | |
|---|---|---|---|
| 4,476,384 A | 10/1984 | Westphal | |
| 6,403,960 B1 * | 6/2002 | Wellnitz | G01T 1/171 |
| | | | 250/363.09 |
| 2013/0060134 A1 * | 3/2013 | Eshima | A61N 5/1049 |
| | | | 600/431 |

OTHER PUBLICATIONS

International Search Report for corresponding application No. PCT/IB2016/052228 dated Jul. 7, 2016.
Westphal G. P.: "Computer Predictions and Automated Systems Real-Time Correction of Counting Losses in Nuclear Pulse Spectroscopy"; vol. 70 No. 1-2; Journal of Radioanalytical Chemistry; pp. 387-410; XP55283736 / Jan. 1, 1982.

(Continued)

*Primary Examiner* — Yara B Green (57) ABSTRACT

For count loss correction, the capability of the discriminator, measured periodically, to detect an event is identified. Rather than inserting an actual event or a signal emulating an actual event for discrimination, the capability to discriminate is tested by a virtual injection. The count loss may be directly measured without causing extra actual discrimination by the discriminator. Direct measurement with virtual testing may avoid loss of accuracy due to time and use-case variation.

19 Claims, 3 Drawing Sheets

(56) References Cited

OTHER PUBLICATIONS

Westphal G. P.: "Review of loss-free counting in nuclear spectroscopy"; Journal of Radioanalytical and nuclear Chemistry; Kluwer Academic Publishers; DO; vol. 275 No. 3; pp. 677-685; XP019610255; ISSN: 1588-2780 / Oct. 13, 2007.

* cited by examiner

GAMMA SYSTEM COUNT LOSS CORRECTION WITH VIRTUAL PULSE INJECTION

CROSS-REFERENCE TO RELATED APPLICATIONS

This disclosure claims the benefit of U.S. Provisional Patent No. 62/151,557, filed on 23 Apr. 2015, the entire contents of which are hereby incorporated by reference.

BACKGROUND

This disclosure relates to count loss correction in nuclear imaging. For example, quantization in single photon emission computed tomography (SPECT) imaging uses count loss correction to provide more accurate estimates of activity in the patient. The detector front-end signal processing and discriminator may cause undercounting of events due to dead time. The dead time (also called a count loss) of a nuclear imaging system or gamma camera is the time during which the system processes one or more events and is not available to process succeeding or concurrent events. The electronic circuits in a nuclear imaging system and the complex interaction between such circuits result in dead time.

Because of the dead time phenomenon, the rate at which events are processed by the system is a non-linear function of the rate of incoming events. Furthermore, the count rate losses also depend on the total number of emissions produced, including those emissions that lie outside the energy window of the channel analyzers of the system. Thus, the dead time of a nuclear imaging system depends on the nature of the system and the type of field interacting therewith.

In one approach to compensate for the dead time, the true rate as a function of apparent rate is empirically measured for a system that approximates a clinical system. This relationship of actual to apparent is stored in a look-up table (LUT). The front-end count rate for future patients is then estimated by using the look-up table (LUT). For example, a count rate achieved by the SPECT system is correlated to loss using the lookup table (LUT).

Since this approach is time-invariant or case-in variant, it reduces the accuracy of the count loss correction. Dead time is extremely complicated and is dependent not only on the inherent limitations of the nuclear imaging system itself but also on the nuclear spectra with which the system is interacting. Consequently, the use of an empirical function to compensate for dead time introduces error or fails to account for variation. Any nuclear imaging system aspects that are time varient or use-case varient may reduce the accuracy of the count loss correction.

SUMMARY

By way of introduction, the preferred embodiments described below include methods, systems, and non-transitory computer readable media for count loss correction. The capability of the discriminator, measured periodically, to detect an event is identified. Rather than inserting an actual event or a signal emulating an actual event for discrimination, the capability to discriminate is tested by a virtual injection. The count loss may be directly measured without causing extra actual discrimination by the discriminator. Direct measurement with virtual testing may avoid loss of accuracy due to time and use-case variation.

In a first aspect, a method is provided for count loss correction for a gamma system. A state of an event discriminator of the gamma system is determined. When the event discriminator would output an event responsive to a virtual pulse is indicated based on the state. Count loss in the gamma system is corrected based on the indication of when the event discriminator would output the event.

In a second aspect, a system is provided. A photo detector is configured to generate a data stream based on photons received from a scintillation crystal. An analog-to-digital converter is configured to convert the data stream to a digital data stream. A discriminator is configured to discriminate events captured in the digital data stream and to periodically test that the discriminator is operable to discriminate virtual events. An acquisition processor is configured to directly sample a count loss from a difference of a number of the times that the discriminator is operable to discriminate the virtual events from a number of times the discriminator is periodically tested.

In a third aspect, a method is provided for count loss correction for a gamma system. A virtual gamma-event injection signal is injected into discriminator event control logic of a discriminator. A control symbol indicating that the discriminator is not operable to discriminate the virtual gamma-event injection signal is generated. The discriminator not being operable is due to being in a dump state, due to the last detected event arrival time occurring within a detector resolving time, or due to an instantaneous global energy signal amplitude exceeding a dynamic range of an energy channel. The control symbol is added to an output stream of gamma events. Count loss of the gamma events is corrected as a function of the control symbol.

The present invention is defined by the following claims, and nothing in this section should be taken as a limitation on those claims. Further aspects and advantages of the invention are discussed below in conjunction with the preferred embodiments and may be later claimed independently or in combination.

BRIEF DESCRIPTION OF THE DRAWINGS

The components and the figures are not necessarily to scale, emphasis instead being placed upon illustrating the principles of the invention. Moreover, in the figures, like reference numerals designate corresponding parts throughout the different views.

DETAILED DESCRIPTION

Count loss correction in a gamma system uses virtual pulse injection. Gamma detector count loss is performed by virtual gamma-event pulse injection into a digital discriminator event control logic. Rather than injecting signals emulating a measured pulse, the state of the discriminator indicates the discriminator reaction to pulse signals as if those pulse signals had been injected. If the digital discriminator (1) is not in a dump state, (2) the last detected event arrival time is longer than the detector resolving time, and (3) the instantaneous global energy signal amplitude is within the energy channel dynamic range such that a real gamma-event would not be dumped, then the virtual pulse injection logic identifies that a pulse would be discriminated at that time. If any of 1-3 are false, then the virtual pulse injection logic identifies that no pulse would be discriminated at that time.

A virtual pulse control word or symbol is added into the X, Y, E detector event stream. The X, Y, E detector event stream is produced by the detector and received by the acquisition computer.

This check of the state and output of control information indicating the discriminator response based on the state is performed periodically. The acquisition computer uses the number of virtual pulses or checks and the number of times the discriminator would have discriminated if the pulse occurred to determine the count loss.

Figure 1:
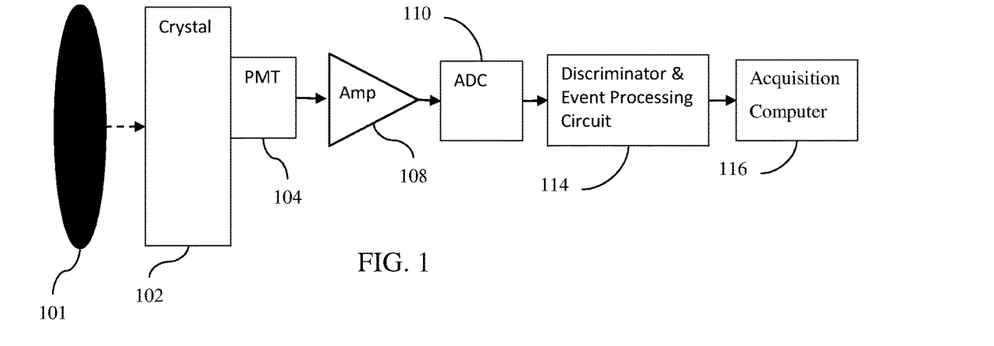
FIG. 1 is a schematic depiction of an example system for count loss correction.

FIG. 1 depicts a schematic of an exemplary gamma system for count loss determination using a virtual pulse or state of the discriminator rather than injecting a pulsed event into a data stream obtained from an object 101 (e.g., a patient) via one or more photomultiplier tubes 104. The gamma system includes a gamma camera head with a scintillation crystal 102, photo detectors 104 (hereinafter photomultiplier tube(s) 104), amplifiers 108, analog to digital converters 110 (ADC), a discriminator and event processing electronics 114, and an acquisition computer 116. Additional, different, or fewer components may be provided. For example, integrators that integrates the area under the pulses to determine energy (e.g., summing up the number of scintillator photons produced by the gamma ray interaction) are provided.

The scintillation crystal 102 is a sodium iodide crystal. Other crystals may be used. Stimuli from a radiation field interact with the crystal 102, thereby producing light photons in the crystal 102. The crystal 102 generates light in response to gamma emissions from the patient 101.

The photomultiplier tubes 104 are arranged in a predetermined array with respect to the scintillation crystal 102. In response to light generated in the crystal 102, the photomultiplier tubes 104 produce signals, the amplitudes of which are directly related to the relative distance of a gamma event from the photomultiplier tubes 104. While the photo detectors detailed herein are referred to as photomultiplier tubes 104, other photo detectors may also be used, such as silicon photo multipliers or silicon drift diodes.

The amplifier 108 is a pre-amplifier. In one embodiment, the amplifier 108 is a trans-impedance pre-amplifier, but other amplifiers may be used.

Figure 3:
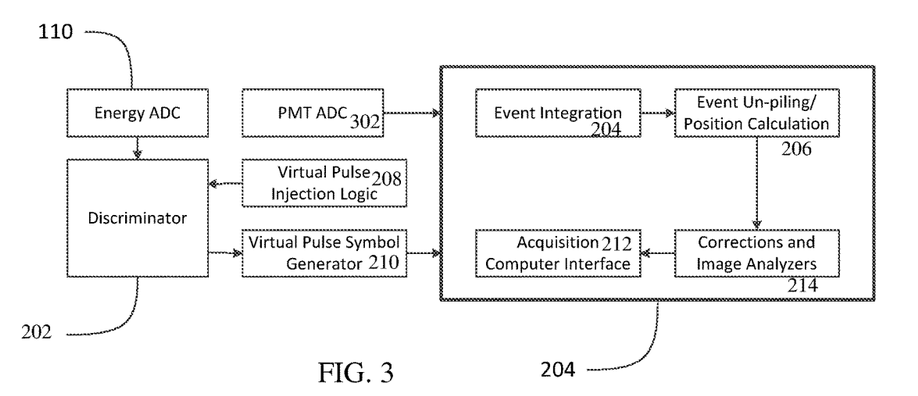
FIG. 3 is a schematic depiction of another example system for count loss correction.

The ADC 110 converts the analog signals into digital signals. Any combination of PMT and energy ADCs may be used, such as ADCs operable at mega-hertz clock rates. In one embodiment, the ADC 110 is a flash ADC (FADC). In a second embodiment, the energy ADC 110 has a sample rate of 4 times the individual PMT ADC 302 sample rate.

In the FIG. 1, a gamma ray emanating from the object 101 impinges on the scintillation crystal 102 interacting with the crystal 102 and releasing a large number of scintillation photons. The scintillation photons are collected in the plurality of PMTs 104. For each gamma (γ) event in the crystal 102, a distribution of scintillation light signals is supplied to the PMTs 104. The spatial distribution of the scintillation light signals is a measure of the location in the crystal of the gamma event causing such signals in the crystal. Light photons produced in the scintillation crystal 102 decay with a characteristic lifetime leading to electronic signals with distinctive shape characterized by a rapidly rising leading edge and a trailing edge with a time constant corresponding to the scintillator decay time and amplifier bandwidth. The PMTs 104 are configured to generate a data stream based on photons received from the scintillation crystal 102.

The amplifier 108 amplifies the signals output from the PMTs 104. The ADC 110 digitizes the data of the data stream arriving from the PMTs 104 based on photons in the crystal 102. The data stream is converted into a digital data stream.

The discriminator and event processing electronics 114 is a field programmable gate array. In other embodiments, other circuits and/or processors may be used. The discriminator 114 is configured to discriminate individual emission events (i.e., gamma decay) from the signals provided from the ADC 110.

Figure 2:
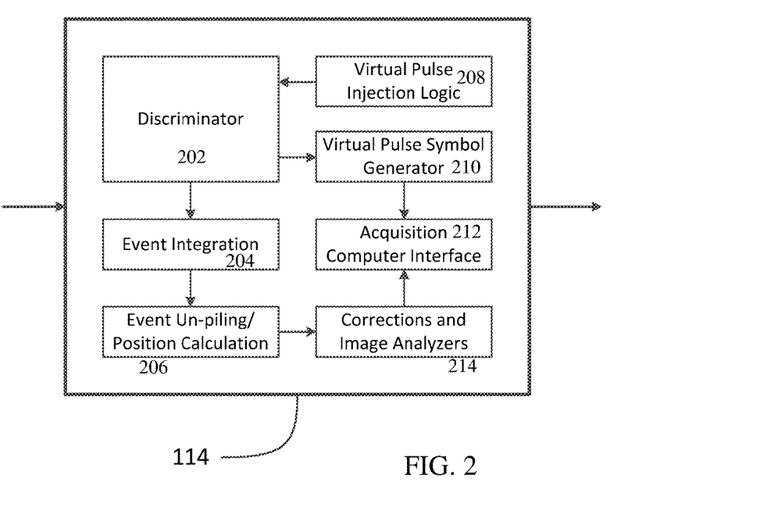
FIG. 2 illustrates one embodiment of the discriminator and event processing circuit.

In general and as shown in FIG. 2, the discriminator and event processing electronics 114 or a separate integrator 204 integrates the signals produced by the photomultipliers 104 (e.g., energy ADC 110 and PMT ADC 302 (see FIG. 3)) and produces, for each group of input signals, a group of output signals for the coordinates of a gamma event. The discriminator 202 uses the sample data information to discriminate between different gamma emission events from the data stream. The event coordinates are spatial coordinates (x-y coordinates) and energy channel (E-channel). The energy represents total energy of a gamma event in the crystal and is used to associate the spatial coordinate signals, x, y with a gamma event corresponding to a particular energy or energy range. In other words, if the energy signal lies within a predetermined energy window of a single channel analyzer that is part of the coordinate computation circuitry, then a conclusion is reached that the event causing the coordinates to be generated arose from a primary radiation stimulus interacting with scintillation crystal 102 and not from secondary radiation. If the signal lies outside the energy window of any given channel analyzer, then no record in the image memory corresponding to that energy window is made. The electronic circuitry of the discriminator and event processing electronics 114 thus processes groups of input signals and produces groups of output signals that represent an interaction of a stimulus with the camera head.

Figure 4:
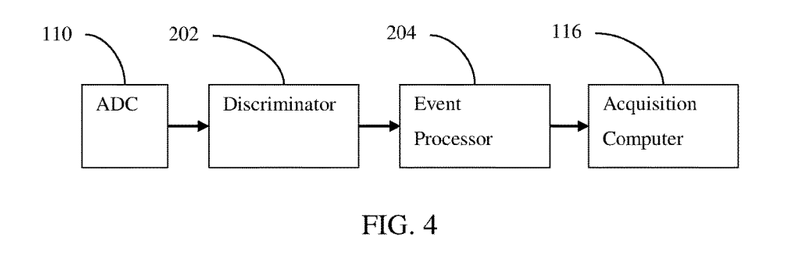
FIG. 4 is a schematic depiction of yet another example system for count loss correction.

The discriminator and event processing electronics 114 or a separate back-end processor may correct or alter the event data with the event un-piling/position calculation circuit 206 and/or corrections and image analyzers 214. FIGS. 3 and 4 show embodiments with a separate back-end or event processor 204, such as another field programmable gate array or other processor and memory. For example, the event processor 204 includes a circuit for un-piling 206 that unpiles those pulses whose pulse shapes overlap in time. Other functions, such as correcting for system errors and image analysis 214, acquisition computer interface 212, and event integration 204, may be performed by the event processor 204. The resulting spatial (x, y) and energy (E) data is passed to the acquisition computer 116.

The discriminator 114 periodically tests whether the discriminator 114 is operable to discriminate virtual events. For each virtual pulse, signaled by the virtual pulse injection logic 208, the state of the discriminator 114 is examined. Due to being in a dump state (e.g., too many events at similar times or a cosmic radiation event) or other operation, the discriminator 114 may not be able to discriminate an additional event at a given time. By examining the state of the discriminator 114, the ability to discriminate is determined without causing further burden by injecting a pulse to be discriminated. The discriminator 114 is virtually tested for dead time operation or not at each of a plurality of times.

Any reason for being able or not to discriminate may be tested. In one embodiment, the discriminator 114 is tested for ability to discriminate or operate at each given time by testing for the discriminator not being in a dump state, for the last detected one of the events having occurred longer than a resolving time of the discriminator, and for an instantaneous global energy signal amplitude within an energy channel dynamic range. Other state information, with or without comparison to thresholds or pulse characteristics, may be used to determine whether a virtual pulse would be discriminated or not (e.g., whether the discriminator 114 was in dead time or not).

The discriminator and event processing electronics 114 outputs the space and energy information (X, Y, E) for the discriminated events and a symbol or other control information showing results of the virtual pulse testing. The control information is different from the space and energy information since actual events or injected events are not actually discriminated. For example, a bit is used as a flag to indicate the discriminator 114 capability to discriminate at each of the periodic tests. The control information may include the symbol indicating whether the discriminator would have discriminated further events at periodic times. The result of the test for each virtual pulse is represented by the symbol. In one embodiment, the discriminator 114 tests for whether periodic virtual pulses could be discriminated and outputs results of the tests as the symbols (e.g., a binary or control bit indicating positive and negative for ability to discriminate a given virtual pulse).

The discriminator 114 and/or the separate back-end processor 204 may insert control information in the data stream or provide the control information through a separate communication. For example, the symbol is passed to the event processor 204 by the virtual pulse symbol generator 210, which passes the results to the acquisition computer 116 through the acquisition computer interface 212. Other communications paths may be used, such as from the discriminator and event processing electronics 114 to the acquisition computer 116 without passing through the event processor 204.

Alternatively, the control information includes the state of the discriminator at the periodic times at which the virtual pulse response is to be tested. Other devices may test, such as using measures of state from the discriminator 114 to test rather than using logic in the discriminator 114 itself to test.

The acquisition computer 116 functions to count the number of digitized pulses and form an image. The number of pulses for actual events from the patient 101 is corrected for count loss.

The acquisition processor 116 is configured to directly sample a count loss. Since virtual pulses are used by testing the state of the discriminator 114, an exact count loss is provided as a direct sampling of the discriminator logic. During the process of data acquisition from the object 101, the discriminator 114 checks the state at a predetermined rate and amplitude (energy). Since the discriminator 114 is tested at a given rate, the dead time is computed by the acquisition computer 116 by counting the number of virtual pulses that could have been discriminated based on the state of the discriminator 114, subtracting these pulses from the number of virtual pulses or testings and computing the percentage of count loss or dead time. The count loss is calculated as shown in the Equation (1) below.

$$\text{Percent Count Loss} = \frac{\left(\begin{array}{l}\text{Number of pulses introduced} - \\ \text{Number of pulses detected}\end{array}\right) \times 100}{\text{Number of pulses introduced}} \quad (1)$$

The count loss or dead time of the gamma camera may then be corrected based on the value obtained from the Equation (1). The number of counted events is corrected based on the count loss for quantitative SPECT or other nuclear imaging.

The number of virtual pulses that could have passed through to the image using one or more energy windows, preferably two or more windows and more preferably at least 3 windows, is calculated. By knowing the number of virtual pulses that were originally tested and the number of virtual pulses that could have been discriminated if actually injected by combining the information received from the windows, the computer 116 calculates the amount of dead time of count loss.

Figure 5:
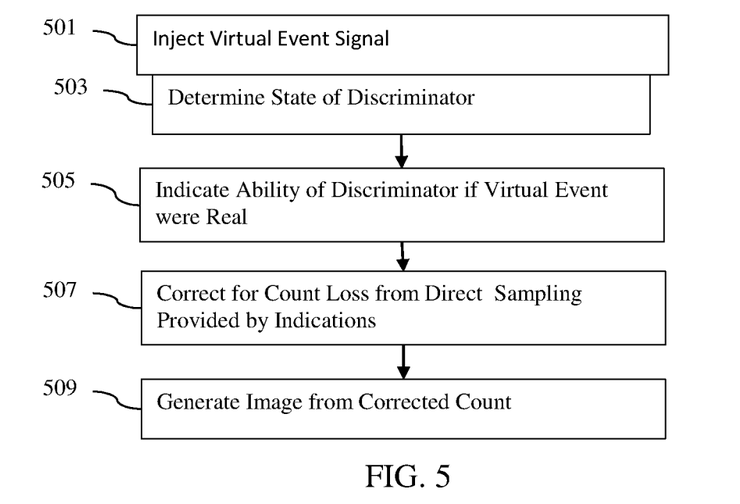
FIG. 5 is a flow chart diagram of one embodiment of a method for count loss correction in a gamma system.

FIG. 5 shows one embodiment of a method for count loss correction for a gamma system. Rather than injecting signal for the discriminator to attempt to discriminate and rather than relying on empirical measurements, the capability of the discriminator based on the current state of the discriminator is tested. Whether the discriminator could discriminate is determined and used for count loss, avoiding the processing for actually attempting to discriminate. The input data stream to the discriminator is not altered or does not include injected signal for count loss detection, but instead the state of the discriminator is examined to determine capability.

The method is performed by a discriminator and acquisition computer. Other devices may alternatively or additionally be used.

Additional, different, or fewer acts may be provided. For example, act 509 for generating an image is not provided. As another example, acts for configuring the system and/or imaging a patient are provided. The acts are performed in the order shown (e.g., top to bottom) or other orders.

In act 501, the discriminator injects a virtual gamma-event signal into discriminator event control logic of the discriminator. The injection is virtual, so an event does not actually occur. There is no injection into the discrimination data stream input. Instead, the control logic determines the state of the discriminator to determine whether the discriminator would discriminate an event if the virtual event signal were in the data stream. Without adding event samples to the gamma events, the state of the discriminator is tested.

Pulse injection on the analog side of the signal chain, while possible, potentially introduces large temperature dependent DC offsets that are orders of magnitude greater than the native front-end electronics. For example, the pre-amp 108 has an input offset temperature coefficient of 0.05 uV/C. The entire signal chain DC stability budget (from the PMT trans-impedance amplifier, summing amplifiers and ADC flash amplifiers, and ADC reference amplifiers), as observed at the PMT and ADC inputs, is 250 uV under all operating conditions (e.g., temperature, operating voltage, time . . . ). While these concerns may be overcome by the addition of dynamic baseline correction or alternate analog circuit implementation with improved stability, such solutions add cost and complexity to an already delicate area of the gamma camera architecture. Analog or digital injection into the input data stream itself increases dead-time as the discriminator responds to the injected signal. Conversely, merely examining the state of the discriminator (i.e., virtual pulse) to predict the response if the virtual pulse was an actual pulse has no discriminator occupancy and therefore no impact on front-end detector dead-time.

The virtual event signal is injected periodically. The testing of the discriminator is performed regularly, such as every 1, 5, 10, or 100 kHz. The period may be based on emperical testing of the type of gamma camera or electronics. Irregular injection may be used. The injection of the virtual signal occurs in real-time with the acquisition of data from the patient.

Act 503 represents one approach for injection of the virtual signal. A state of an event discriminator of the gamma system is determined. The logic or controller of the digital discriminator determines the state. Alternatively, a separate device measures or receives information from the discriminator, be it analog or digital, to determine the discriminator state.

The current operation settings of the event discriminator are determined. For example, a dump setting, a difference in time of a last detected event arrival to a resolving time of the event discriminator, and whether an instantaneous global energy signal amplitude including contribution from the virtual pulse is within a dynamic range of the event discriminator are determined. Other information and/or relationships for comparison may be used to indicate whether the discriminator is capable of discriminating a virtual pulse with specific characteristics at a given injection time.

In act 505, the discriminator or other testing device indicates when the event discriminator would output an event responsive to a virtual pulse based on the discriminator state. The test results are indicated for count loss calculation. If the discriminator is not operable to discriminate the virtual pulse due to being in a dump state, due to the last detected event arrival time occurring within a detector resolving time, or due to an instantaneous global energy signal amplitude exceeding a dynamic range of an energy channel, then the virtual pulse control logic generates an indication that the virtual pulse would not be discriminated. If the discriminator is operable to discriminate the virtual pulse due to not being in a dump state, the last detected event arrival time occurrence is longer than the detector resolving time, and the instantaneous global energy signal amplitude is within the energy channel dynamic range, then the virtual pulse control logic generates an indication that the virtual pulse would be discriminated.

The indication is a flag, such as a bit, that flags the ability of the discriminator to discriminate or not. This flag-based-on-state determination is output as an indication as if the virtual gamma-event injection signal were included with the signals from the gamma events of the patient, even though no such actual injection occurs. Other indicators may be used, such as output the state information or indication of settings of the discriminator for determination of ability by other devices.

In one embodiment, the results of the tests are output as a control symbol. The control symbol may be added to the output stream of detected gamma events. The symbol is included as a flag in the event stream of position and energy information (e.g., X, Y, and E channels), but is not position or energy information itself. A different type of information than the position and energy data is output, such as the results of the test. Since a direct sampling using virtual injection is used, there is no position or energy information for the virtual pulse. Instead, the control symbol indicating that the discriminator is or is not operable to discriminate the virtual gamma-event injection signal is added to the event stream. A virtual gamma event pulse dead-time control symbol (e.g., binary representation of when the event discriminator would or would not output an event if the virtual pulse were actually input to the discriminator) is injected into the detector X, Y, E output event stream.

In other embodiments, separate communication is used. For example, the control symbol is output along a separate communication path or separate data stream than the discriminated events.

The indication is output to the acquisition computer. Where the indication is inserted within the data stream for the detected or discriminated events, the acquisition computer receives the indications with the discriminated events. Where the indication is separately communicated, then a different interface receives the indications. The indication is output directly to the acquisition computer, or passes through one or more other devices. For example, the discriminator outputs the symbol to a back-end processor, which outputs the symbol to the acquisition computer.

The number of tests performed or the period of testing is communicated to the acquisition computer. Alternatively, the acquisition computer stores the period. The number of tests may be determined from a trigger occurrence based on the period.

When the discriminator is able to discriminate is determined and indicated to the acquisition computer with direct sampling. This direct sampling occurs without relying on detection of an event, whether from the patient or injected emulation of a gamma event. The determination and indication occur in real-time with discrimination of events from the patient, but without causing extra dead time due to injection of event signals for count loss.

In act 507, the acquisition computer corrects for the count loss. The acquisition computer calculates a count of discriminated events. For quantitative nuclear imaging (e.g., quantitative SPECT), the count is used as an absolute or accurate indication of the quantity of emissions by location in the patient. Since the discriminator may be occasionally unable to discriminate, the detected events are an undercount. To be more accurate, an adjustment accounting for loss of counts is applied by the acquisition computer.

The loss ratio, percentage of loss, or other value used for count loss correction is calculated by the acquisition computer. The acquisition computer corrects for count loss in the gamma system based on the indications of when the event discriminator would output the virtual event. Using the control symbol, a number times at which the discriminator is capable of discriminating based on testing with virtual pulses is known. Given the number of virtual pulses or symbols regardless of result, the ratio or percentage is calculated. The indications responsive to the virtual pulses and the number of tests using the virtual pulses provide the loss ratio, percentage loss, or other loss value. The virtual pulse dead-time symbol presence or absence is used for gamma detector count loss correction by indicating a ratio or loss rate for the discriminator in real-time with the detection of events from the patient. This count loss may be more accurate as the testing with the virtual pulse does not introduce further risk of dead time of the discriminator because the virtual pulses are not actually discriminated.

The count loss ratio, percentage, or other value is used to correct the counts of the actual events. The count for actual events may be scaled (e.g., weighted or multiplied by the count loss) based on the count loss. Alternatively, the count loss is used with other information to adjust the count of actual events, including but not limited to scatter correction algorithms.

In act 509, the acquisition computer or other processor generates an image. The spatial and energy information with the corrected counts are used to generate an image. In SPECT, one or more projections from different directions relative to the patient are used. Each projection provides a count for each spatial location over an area. Given the different directions for the projections, computed tomography or other reconstruction provides counts by voxel. A two-dimensional extraction or three-dimensional rendering may be used to generate the image. In alternative embodiments, a projection along one angle relative to the patient is used to generate an image. Other gamma camera imaging may be used.

The counts used for imaging are mapped to brightness, color, shade, and/or other characteristic in the image. Since the counts are corrected for loss, the actual counts may be more accurately provided to the physician for diagnosis. In addition, specific uptake values (SUV) are computed using count-loss corrected and attenuation corrected data within a volume of interest, to numerically quantify the patient activity level.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

We claim:

1. A method for count loss correction for a gamma system, the method comprising:
    at each of two or more test periods, determining a state of an event discriminator of the gamma system by determining whether the event discriminator is in a dump state and whether an instantaneous global energy signal amplitude exceeds a dynamic range of the event discriminator;
    at each of the two or more test periods, determining whether the event discriminator is able to discriminate an additional event based on the state determined at the respective test period; and
    correcting for count loss in the gamma system based on the determinations of whether the event discriminator is able to discriminate an event.

2. The method of claim 1 wherein event discriminator comprises a digital discriminator.

3. The method of claim 1 wherein determining the state comprises determining current operation settings of the event discriminator.

4. The method of claim 3 wherein determining the current operation settings comprises determining whether the event discriminator is in a dump state, a difference between a time from a last detected event arrival and a resolving time of the event discriminator, and whether an instantaneous global energy signal amplitude exceeds a dynamic range of the event discriminator.

5. The method of claim 1 further comprising outputting a binary representation of the indication indicating that the event discriminator is able to discriminate an additional event.

6. The method of claim 1 further comprising outputting a control symbol in an event stream including position and energy information, the control symbol indicating that the event discriminator is able to discriminate an additional event.

7. The method of claim 6 wherein the event stream is output to an acquisition computer of the gamma system.

8. The method of claim 1 wherein determining whether the event discriminator is able to discriminate an additional event is performed without inserted emulation of a gamma event.

9. The method of claim 1 wherein correcting comprises determining a ratio of a number of determinations that the event discriminator is able to discriminate an additional event to the number of test periods.

10. The method of claim 1 wherein correcting comprises correcting a number of detected gamma events from a patient, and further comprising generating an image based on the corrected number of detected gamma events.

11. The method of claim 10 wherein determining whether the event discriminator is able to discriminate an additional event is performed in real-time with detection of the gamma events from the patient.

12. A system comprising:
    a scintillation crystal;
    a photo detector configured to generate a data stream based on photons received from the scintillation crystal;
    an analog-to-digital converter configured to convert the data stream to a digital data stream;
    a discriminator configured to discriminate events captured in the digital data stream and to periodically determine whether the discriminator is operable to discriminate an additional event at a given time by determining whether the event discriminator is in a dump state and whether an instantaneous global energy signal amplitude exceeds a dynamic range of the discriminator; and
    an acquisition processor configured to directly sample a count loss based on a difference between a number of the times that the discriminator is determined to be operable to discriminate an additional event and a number of periodic determinations.

13. The system of claim 12 wherein the discriminator comprises a first field programmable gate array; and
    further comprising a second field programmable gate array configured to receive results of the periodic determinations, each of the results comprising a bit, and to output the results to the acquisition processor.

14. The system of claim 12 wherein the discriminator is configured to determine whether the discriminator is in a dump state, whether a time since a last detected event occurred is longer than a resolving time of the discriminator, and whether an instantaneous global energy signal amplitude exceeds an energy channel dynamic range.

15. The system of claim 12 wherein the discriminator is configured to output space and energy information for each of the events and a symbol different than the space and energy information indicating results of the periodic determininations.

16. A method for count loss correction for a gamma system, the method comprising:
    injecting a virtual pulse into discriminator event control logic of a discriminator;
    in response to the virtual pulse, generating a control symbol indicating that the discriminator is not operable to discriminate an additional event due to being in a dump state, or due to an instantaneous global energy signal amplitude exceeding a dynamic range of an energy channel;
    adding the control symbol to an output stream of gamma events; and
    correcting for count loss of the gamma events based on the control symbol.

17. The method of claim 16 wherein injecting the virtual pulse comprises testing a state of the discriminator without adding event samples to the gamma events.

18. The method of claim 16 wherein generating the control symbol comprises flagging an ability of the discriminator to discriminate or not as if the virtual gamma-event injection signal were included with signals of the gamma events.

19. The method of claim 16 wherein correcting comprises determining a ratio of a number of control symbols in the output stream to a number of virtual pulses.

* * * * *

UNITED STATES PATENT AND TRADEMARK OFFICE
CERTIFICATE OF CORRECTION

PATENT NO. : 10,353,081 B2  
APPLICATION NO. : 15/567469  
DATED : July 16, 2019  
INVENTOR(S) : James Frank Caruba and Ronald E. Malmin Page 1 of 1

It is certified that error appears in the above-identified patent and that said Letters Patent is hereby corrected as shown below:

In the Specification

In the Detailed Description Section Column 9, Lines 12-13, "The counts used for imaging are mapped to brightness, color, shade, and/or other characteristic in the image..." should read "The counts used for imaging are mapped to brightness, color, shade, and/or other characteristics in the image..."

In the Claims

Column 9, Claim 2, Lines 45-46, "The method of claim 1 wherein event discriminator comprises a digital discriminator." should read "The method of claim 1 wherein the event discriminator comprises a digital discriminator."

Column 10, Claim 15, Lines 49-53, "The system of claim 12 wherein the discriminator is configured to output space and energy information for each of the events and a symbol different than the space and energy information indicating results of the periodic determininations." should read "The system of claim 12 wherein the discriminator is configured to output space and energy information for each of the events and a symbol different than the space and energy information indicating results of the periodic determinations."

Signed and Sealed this  
Tenth Day of August, 2021

Drew Hirshfeld  
*Performing the Functions and Duties of the  
Under Secretary of Commerce for Intellectual Property and  
Director of the United States Patent and Trademark Office*